June 12, 1956   M. R. GROSS   2,750,561
INDICATOR FOR LOW PERMEABILITY MATERIALS
Filed April 25, 1952
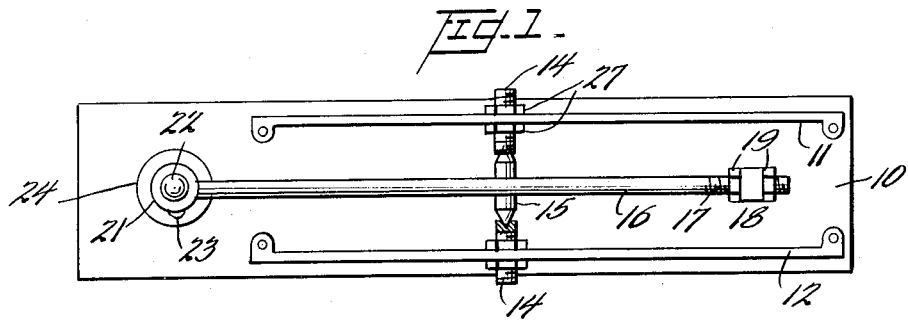
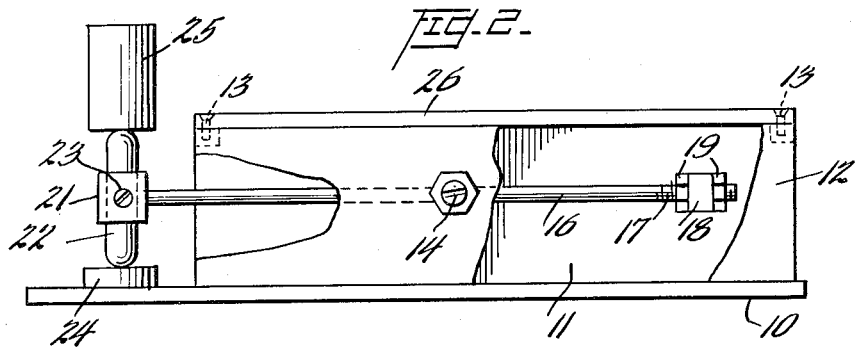
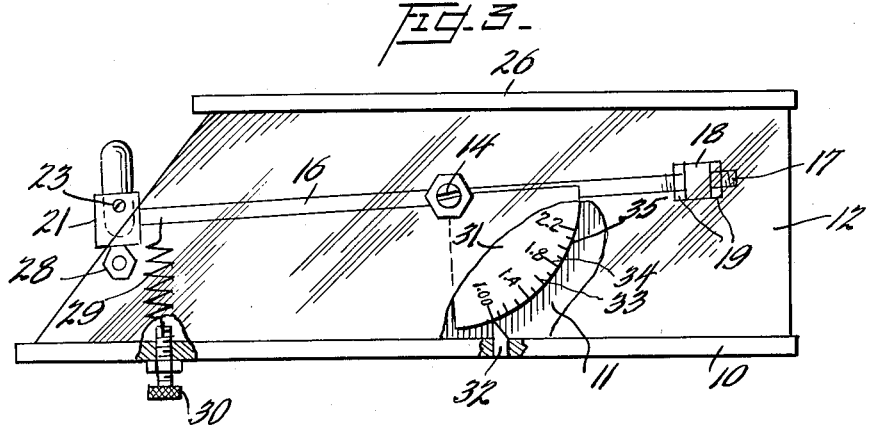
INVENTOR
*Martin R. Gross,*
BY *B. L. Zangwill*
ATTORNEY

United States Patent Office 2,750,561
Patented June 12, 1956

2,750,561

INDICATOR FOR LOW PERMEABILITY MATERIALS

Martin R. Gross, Annapolis, Md., assignor to the United States of America as represented by the Secretary of the Navy Application April 25, 1952, Serial No. 284,481

6 Claims. (Cl. 324—34)

(Granted under Title 35, U. S. Code (1952), sec. 266)

The invention described herein may be manufactured and used by or for the Government of the United States of America for governmental purposes without the payment of any royalties thereon or therefor.

This invention relates to magnetic permeability indicators and more particularly to means for gauging permeability of samples having very low permeability.

Previous practice for the determination of the permeability of sample materials has involved the use of permeameters such, for example, as the Fahy Low-mu permeameter employed with samples cut to a specified shape and dimension. These devices are accurate but inherently expensive and difficult to use, requiring the careful manufacture of samples to prescribed dimensions. Furthermore these permeameters do not provide means for examining specimens of heterogeneous size and shape, nor can they be quickly used with any given sample.

An object of this invention is to provide a permeability indicator in the low permeability range which will accept objects of varying shape and indicate with moderate accuracy the permeability thereof.

A further object is to provide an indicator of the accept-or-reject type suitable for mass production use to test compliance of samples with an upper or lower limit of permeability.

A still further object is to provide a rapid means of determining compliance of miscellaneous magnetic material with a commercial permeability specification.

A final object is to provide an indicating device for rapid successive use in indicating within a few percent the permeability of the material of which sample objects may be constructed, regardless of dimensions or shape.

The exact nature of this invention as well as other objects and advantages thereof will be readily apparent from consideration of the following specification relating to the annexed drawing in which:

Fig. 1 is a plan view of a preferred embodiment of the invention,

Fig. 2 is a side elevation of the device of Fig. 1, one side being partly broken away, and Fig. 3 is a side elevation of an alternative construction provided with means for indicating permeability on a graduated scale.

Referring now to the drawings wherein like reference characters designate like or corresponding parts throughout the several views, there is shown in Fig. 1 a horizontal base 10 upon which are mounted a pair of vertical supporting plates 11 and 12 spaced apart a convenient distance as desired for mounting the remaining portions of the apparatus, the plates being secured to the base in any convenient manner as by screws 13. Plates 11 and 12 each have fitted thereon a pivot socket 14 arranged to receive a pivot shaft 15, or other like low friction journal or pivot arrangement, for supporting a horizontal lever arm member 16. The lever or bar 16 may conveniently have the shaft 15 inserted centrally therethrough and at right angles thereto such that the bar is free to rotate about the central axis of the pivot shaft, movement of the member 16 being confined to a vertical plane when mounted as illustrated in Figs. 1 and 2.

Depending upon the sensitivity and ruggedness required the pivot sockets 14 may be provided with journal-and-cap or conical cup type jewel bearings to reduce the friction and assure stability and constancy of balance of the bar 16. For this purpose it is convenient to provide adjusting nuts 27 at either side of plates 11 and 12 for adjusting and maintaining a pivot cup spacing. A cover plate 26 is preferably secured to walls 11 and 12 to complete a box type structure and better maintain pivot socket spacing.

At one end of the member 16 there is provided a threaded portion 17 upon which is mounted a counter balancing weight 18 which is adjusted and locked into position by lock nuts 19, this adjustment being sufficient to cause the bar 16 to be precisely balanced when no magnetic material is within the vicinity of the magnetic element hereinafter described.

At the opposite end of the member 16 from the weight 18 there is provided a collar 21 rigidly attached to the bar 16 having a central bore therethrough on which is inserted a magnet member or head 22, which may conveniently be of cylindrical shape and secured rigidly within the collar by press-fitting or by set screw 23. The magnet 22 is preferably of high magnetic coercive force and moderately high magnetic moment, such as to be provided by a small Alnico V magnet. The ends of this magnet are carefully ground to a uniform and equal shape, particular care being taken to assure that the radius of curvature shall be the same at the two ends thereof. For this purpose a hemispherical shape is suitable or a conical shape with a definite radius of curvature at the end thereof might be used. The important feature of this curvature is to provide a means for contacting a flat surface at substantially a single point with equal separation of the adjoining portions of the curved surface from the more or less flat surface being contacted.

An anvil member 24 is fixedly mounted on the base 10 concentrically with the magnet member 22 as illustrated in Fig. 2. This member 24 may be of circular or rectangular shape as desired and preferably possesses substantial thickness in order to be unsaturated by the field from the magnet 22 when in contact therewith. The member 24 constitutes a sample of known permeability which is used as a standard or comparison permeability. The apparatus herein described is intended for use with materials of relatively low permeability such as stainless steel and the like. By proper choice of material for the member 24 the apparatus may be employed at varying permeabilities throughout a wide range in the low permeability class of materials.

Since the arm 16 is carefully balanced against gravity effects the magnet 22 will remain in any position in which placed by rotation of the member 16 about the pivot axis, in the absence of magnetic material in the vicinity thereof. However, when the anvil member 24 is placed on the base 10 and the magnet 22 is brought into contact with it an attractive force will be exerted which holds the members in contact with a force roughly proportional to the permeability of the anvil member.

To employ the device described a suitable piece of metal having a selected permeability is selected as the anvil member 24, and is placed beneath the magnet 22 and the lower end or working side of the magnet is brought into contact therewith. A sample to be tested, such as 25, is then brought into contact with the opposite end or working side of magnet 22, and the magnet then exerts attractive forces on elements 24 and 25. These attractive forces would be identical at the two ends of the magnet if the two materials were of the same magnetic character and surface condition since the ends of the magnet are similarly shaped. Consequently, movement of the sample 25 away from the member 24 at right angles to the length of the member 16 would break contact at one end of the magnet, sometimes at element 24 and at other times at the sample 25 because of the identity of the attraction forces exerted. However, if elements 24 and 25 are of different permeability the magnet exerts a lesser force upon the material of lesser permeability and withdrawal of the sample 25 causes the magnet to separate invariably from the material of lower permeability. In this manner each movement of the sample 25 into contact with the magnet and the magnet into contact with element 24, and subsequently withdrawal of the sample, results in a test of the relative permeability between the sample 25 and the anvil 24.

It is therefore obvious that the anvil may be selected to have a permeability corresponding to the minimum permeability specification for a production run of articles. When such an anvil is employed all samples from the production run when tested as herein described will result in separating the magnetic from the anvil if the sample has permeability greater than the specification minimum. Conversely, if the anvil is selected to correspond to the maximum specification permeability each sample tested will result in separation of the sample from the magnet leaving the magnet in contact with the anvil for each sample in which the permeability is less than the specification maximum. In use it may be convenient to employ two testing devices for a large run of samples, one having an anvil corresponding to upper permeability limit and the other having an anvil corresponding to the lower specification limit so that each sample may be quickly passed through both tests as the operator picks it up from a tray, passes it through the tube instruments and deposits it either in the accepted tray or in a reject tray corresponding to excessive or deficient permeability.

It will be obvious to those skilled in the art that tested samples having very rough or uneven surfaces characteristics may make poorer contact with the magnet 22 than is made between the magnet and the anvil. This difference in practice is found to be negligible for materials of commercial finish as machined, rolled or otherwise formed, the use of relatively small curvature radius at the ends of the magnet 22 facilitating accurate tests for certain surfaces conditions. It will also be understood that test samples may be of any shape desired, such as bars, cylinders, strips or more complicated shapes having a surface roughly comparable to the surface of the anvil.

The invention as hereinbefore described has been arranged and applied for routine testing of a considerable number of samples having similar specification permeability limits. Other applications of the invention may include approximate determination of the permeability of heterogeneous samples having dissimilar permeabilities. It will be evident that this can be done expeditiously by having readily at hand a series of anvils differing by uniform steps, each labeled with the permeability possessed therein. The sample may then be placed on the base 10 and the anvils brought successively into contact with the opposite end of the magnet until two adjacent steps of permeability are found between which the sample permeability lies. Conversely, the sample may be brought into contact with the magnet and the anvils placed on the base 10 in successive order beginning at the low permeability end of the sequence, such that the magnet remains in contact with the sample as the sample is moved in and withdrawn, thereby to cause the magnet to successively contact the anvils placed thereunder, until an anvil is found which exceeds the permeability of the sample, as evidenced by the magnet separating from the sample and remaining in contact with the anvil.

An alternative arrangement of the invention may be more convenient for some purposes and is illustrated in Fig. 3. In this form of the invention the rotation of the arm 16 is limited in one direction thereof by a stop 28. A spring 29 is fixed at one end thereof at a definite location along the member 16 as by securing to a hole therein or by soldering thereto, and is secured at the other end thereof to the base 10 by means of an adjusting screw 30. When properly adjusted the spring causes the collar 21 to barely contact the stop 28 and any movement of the arm from its position at rest results in extending the spring. A protractor-type dial 31 is mounted on the member 16, the arc thereof being centered at the rotational axis of the shaft 15. The protractor dial is then calibrated in permeability units by employing anvils or other samples of known permeability material each brought into contact with the end of the magnet opposite the stop and withdrawn until contact is broken by the pull of the spring, the position of the dial relative to an index 32 being noted and marked on the dial in successive calibration marks 33, 34 and 35, etc. This form of the invention is convenient for indication of permeability where a considerable uncertainty as to permeability exists. The sample is merely brought into contact with the magnet in the same fashion as described for calibration, and the maximum rotation of the arm 16 before the spring causes breaking of contact is noted in terms of permeability marking marking next adjacent to the index at the time contact is broken.

Inasmuch as the lever arm 16 is fully counter balanced it may be employed as shown with the rotational axis horizontal and the anvil either in contact with a base 10 therebelow as in Fig. 2 or with the arrangement of Fig. 2 placed upside down on a table, the test portion thereof extending over the table edge such that the sample is brought into contact with the magnet from below. It is equally obvious that the device may be employed on its side or in any other position desired. It may, in fact, be hand held and moved into contact with the sample if the sample is of large dimensions or is attached to other apparatus from which it is not readily removed. It is also obvious that the base 10, the walls 11 and 12, screws 13, pivot sockets 14 and cover plate 26 should preferably be of non-magnetic material. It is convenient to employ walls 11 and 12 made of transparent plastic, especially when used with the arrangement of Fig. 3 such that the calibrated dial is directly attached to the arm 16 and observed through a window of transparent plastic or glass.

It will thus be seen that a simple and inexpensive permeability indicator has been provided which may be used under a wide variety of circumstances for very rapid determination of unknown permeability and for quick testing of sample conformity to upper and/or lower specification limits.

Obviously many modifications and variations of the present invention are possible in the light of the above teachings. It is therefore to be understood, that within the scope of the appended claims, the invention may be practiced otherwise than as specifically described.

What is claimed is:

1. In a magnetic permeability indicator, a supporting structure having thereon a pair of pivot bearings oppositely disposed and arranged for supporting a shaft rotatably about an axis, an elongated arm suspended for rotation about said axis, a permanent magnet mounted on one end of said arm with a major magnetic axis tangent to the arc of said rotation of said end of the arm and having regularly curved magnet ends of uniform radius of curvature, means balancing said arm whereby equal forces are required to move said magnet in either direction along said axis thereof; a pair of members made of magnetic material, one of said members comprising an anvil of known permeability fixedly supported on said supporting structure, the other member being of unknown permeability and movable relative to said supporting structure; one end of said magnet being adapted to contact said anvil, said member of unknown permeability being adapted to be moved into contact with the opposite end of said magnet and away therefrom, whereby the magnet will adhere to the member of greater permeability, thereby providing means for indicating which of the two magnetic members has the greater permeability.

2. In a magnetic permeability indicator, a moment arm supported for rotation about a transverse axis thereof and having at one end a permanent magnet possessing hemispherical ends mounted with the magnetic axis thereof at right angles to said arm and to said transverse axis and the arm having at the other end thereof means counter-balancing said magnet, and a mass of magnetic material of predetermined permeability fixedly supported for contacting by said magnet as the arm is rotated, said magnetic material possessing permeability selected at a specification limit, and a second mass of magnetic material of greater permeability adapted to be brought in contact with the opposite end of said magnet, said second mass being subjected to greater attractive force than the attractive force between the first said mass and the magnet.

3. In a magnetic permeability indicator, a moment arm supported for rotation about a transverse axis thereof and having at one end a permanent magnet possessing hemispherical ends mounted with the magnetic axis thereof at right angles to said arm and to said transverse axis and having means precisely counter-balancing the magnet, and a mass of magnetic material of predetermined permeability fixedly supported for contacting by said magnet as said arm is rotated, said magnetic material possessing permeability selected at a specification limit, and a second mass of magnetic material of lesser permeability adapted to be brought in contact with the opposite end of said magnet, said second mass exerting a lesser attractive force than the attractive force between the first said mass and the magnet.

4. In a magnetic permeability indicator, a moment arm comprising an elongated member supported for rotation about a central transverse axis and a magnet at one end thereof counter-balanced by a weight at the opposite end, said magnet being fixedly mounted on the moment arm with a longitudinal axis perpendicular to the plane including said rotational axis and said moment arm, the magnet having uniformly curved magnet ends thereon, and a reference block of magnetic material of known permeability fixedly supported for contact with said magnet as said arm is rotated; a mass of magnetic material adapted to be brought into contact with and drawn away from one end of said magnet, the other end thereof being in contact with said block, whereby a comparison of permeabilities of said block and said mass is effected as said materials are separated from the magnet.

5. A permeability testing device for testing a magnetic piece for at least a limiting permeability, comprising a lever arm comprising an elongated member, and pivot means supporting said elongated member for rotation about a transverse axis, preset biasing means acting on said lever arm, a magnetic head carried by said lever adapted to act on said lever arm oppositely to said biasing means, said head having a pair of working sides, reference means comprising a reference block of magnetic material of predetermined permeability supported in a predetermined position for magnetic coaction with one of said working sides of said magnetic head with said lever arm in a predetermined position; a magnetic test piece of unknown permeability adapted to cooperate with the other of said working sides of the magnet whereby the permeability of said test piece may be compared with that of the reference block.

6. A permeability testing device as defined in claim 5 but further characterized by said working sides of said magnetic head being curved.

References Cited in the file of this patent

UNITED STATES PATENTS

| 2,571,488 | Rooney | Oct. 16, 1951 |
| 2,625,585 | Krouse | Jan. 13, 1953 |
| 2,637,115 | Watson | May 5, 1953 |

FOREIGN PATENTS

| 575,150 | Great Britain | Feb. 5, 1946 |

OTHER REFERENCES

Journal of Scientific Instruments and Physics in Industry, June, 1949, pages 209 to 211, article by Bennett.